United States Patent [19]
Crossman

[11] 3,828,894
[45] Aug. 13, 1974

[54] TELESCOPIC PISTON FOR ADDED BRAKE WEAR ADJUSTMENT

[75] Inventor: Richard L. Crossman, Tallmadge, Ohio

[73] Assignee: The Goodyear Tire & Rubber Company, Akron, Ohio

[22] Filed: Dec. 27, 1972

[21] Appl. No.: 318,882

[52] U.S. Cl............ 188/71.8, 188/72.4, 188/196 A, 188/347
[51] Int. Cl............................................. F16d 65/54
[58] Field of Search............ 188/71.8, 72.4, 196 A, 188/196 B, 347, 216; 60/568, 569, 590, 591

[56] References Cited
UNITED STATES PATENTS

| | | | |
|---|---|---|---|
| 1,825,555 | 9/1931 | Stern | 188/196 B X |
| 1,865,105 | 6/1932 | Houplain | 188/347 X |
| 2,830,680 | 4/1958 | Hawley | 188/71.8 |
| 3,055,456 | 9/1962 | Pfeiffer | 188/196 A X |
| 3,517,785 | 6/1970 | Cunningham | 188/196 B |

*Primary Examiner*—Duane A. Reger
*Attorney, Agent, or Firm*—Oldham & Oldham

[57] ABSTRACT

Disclosed is a telescopic brake piston and return mechanism which provides a means for compensating for the wear affectuated reduced thickness of the brake disk stack of an aircraft braking system. Fundamentally, the telesopic brake piston comprises two interfitting pistons received within a brake housing. The smaller of the two pistons brings the brake disks of the brake disk stack into frictional engagement with each other at which time the second piston causes the application of the working brake force. The smaller piston is provided with a sufficient travel distance to be capable of causing such frictional engagement regardless of reduced thickness of the brake disk stack due to wear. When the smaller piston causes such engagement and the second piston begins to apply the braking force, the smaller piston becomes sealed so as to constitute a solid hydraulic column. The telescopic return mechanism associated with the telescopic piston is such as to return the pressure plate of the brake disk stack a predetermined distance after each braking operation, such distance being independent of the amount of wear experienced in the brake disk stack. Consequently, the return mechanism guarantees that the free travel distance of the pressure plate will be consistent throughout the life of the brake disk stack. Fundamentally, this return mechanism comprises a slotted tubular threaded spring follower which receives a tubular threaded sleeve which in turn receives a still smaller slotted tubular threaded member. The various threads on the elements of the return mechanism interlock and provide the means for compensating for brake disk wear.

12 Claims, 9 Drawing Figures

TELESCOPIC PISTON FOR ADDED BRAKE WEAR ADJUSTMENT

BACKGROUND OF THE INVENTION

Heretofore in the field of aircraft braking systems, it has been known that a plurality of carbon brake disks may be alternately attached to the hub and axle of the aircraft wheels and forced into a frictional engagement to cause the braking of the aircraft. While such carbon disks have been quite desirable for their heat dissipating properties, such disks have a tendency to wear at a much more rapid rate than the steel disks utilized in the prior art. It has consequently become desirable to produce a brake piston and return mechanism which operate efficiently even when the carbon brake disks have substantially reduced in thickness due to wear and which compensate for such wear.

It has further been known that the pistons utilized in wheel braking systems are not fail safe. There are no known braking systems which provide a mechanism for preventing the expulsion of the piston from the piston cylinder except for the pressure plate of the brake disk stack. Using presently known brake pistons and cylinders, it is conceivable that if the carbon brake disk stack wears excessively the brake piston may be forced out of its cylinder thus resulting in a loss of hydraulic fluid and a failure of the braking system.

While telescopic brake piston systems have been suggested in the art, none have been produced which guarantee the utilization of the largest available piston area as the working force area in all braking situations and which further guarantees that even if one piston fails a second piston is available to provide a piston working force area.

It has further been known in the art that numerous types of return mechanisms may be utilized with the pressure plate of the brake disk stack to achieve the proper return of the pressure plate when brake pressure is released. However, no return mechanisms have been conceived which provide for compensation for the brake disk wear of carbon brake disk stacks. It is of course desirable to provide a return mechanism which returns the pressure plate of the brake disk stack to a position dependent upon the amount of wear realized by the stack.

Consequently, it is an object of the present invention to present a telescopic piston and return mechanism which can be utilized in an aircraft braking system comprising carbon brake disk stacks of such a nature that the piston and return mechanism will efficiently operate regardless of the degree of wear on the brake disk stack.

It is a further object of the invention to present a telescopic piston and return mechanism which can compensate for the large degree of wear experience with carbon brake disk stacks so as to increase the usable life thereof.

Still a further object of the invention is to present a telesopic piston and return mechanism wherein the piston is fail safe; having provisions whereby the piston is restrained from leaving the open end of the piston cylinder.

Yet a further object of the invention is to present a telescopic piston and return mechanism wherein the piston assembly comprises a plurality of pistons of such a nature that even when one piston fails a second piston will guarantee effective operation of the braking action.

Still a further object of the invention is to present a telescopic piston and return mechanism wherein the piston, regardless of brake wear, always utilizes the largest available piston area as the working force area to achieve braking of the vehicle.

These objects and other objects which will become apparent as the detailed description proceeds are achieved by a braking system associated with a brake system housing and the pressure plate of a brake disk stack, comprising: a telescopic brake piston subassembly fixedly attached to the brake system housing and in operative engagement with the pressure plate, the piston subassembly causing frictional engagement of the disks of the brake disk stack upon actuation thereof; and a telescopic return mechanism fixedly attached to the brake system housing and in operative engagement with the pressure plate such that upon release of the actuation of the piston subassembly the return mechanism acts to relieve the frictional engagement of the disk of the brake disk stack, the piston subassembly and return mechanism being operationally unaffected by brake disk stack wear.

For a thorough understanding of the objects, techniques, and apparatus of the instant invention reference should be had to the accompanying drawings wherein.

Figure 1:
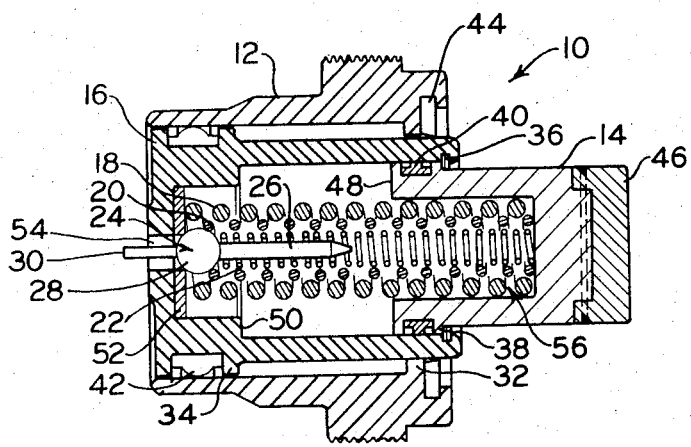
FIG. 1 is a cross sectional view of the telescopic piston subassembly according to the instant invention.

Referring now to the drawings and more particularly FIG. 1, an appreciation of the brake piston subassembly 10 may be had. Here it may be seen that the subassembly 10 basically comprises a sleeve housing 12 wherein is slidably engaged a large piston 16 which in turn slidably receives a smaller piston 14. As can further be seen from the figure, a cavity 56 is created between the pistons 14 and 16 which is characterized by the presence of the concentrically arranged springs 18, 20, and 22. As will become more apparent hereinafter, the cavity 56 may be characterized by the presence of any of a plurality of springs but the preferred embodiment of the invention teaches the utilization of the three concentrically arranged springs wherein the innermost spring is the smallest and weakest and the outermost spring is the strongest.

As can further be seen from FIG. 1, the cavity 56 is further characterized by the presence of the control probe indicated generally by the numeral 24. While the control probe 24 may have any of a variety of physical characteristics, it is contemplated that it comprises a guide pin 26 receivably oriented within the innermost spring 22, a sealing ball 28 connected to one end of the guide pin 26, and a contact pin 30 connected to the sealing ball 28 opposite the guide pin 26.

Provisions have been made to restrict the sliding interrelationships between the pistons 14 and 16 and the sleeve 12. It should be noted that the sleeve 12 is characterized by the presence of a ring shoulder 32 and the piston 16 by the presence of a complementary ring shoulder 34. Consequently, as can be seen in FIG. 1 if the piston 16 would begin movement to the right the sleeve 34 would come into engagement with the sleeve 32 and the sliding motion would thus be inhibited at this rightmost limit. Correspondingly, the piston 16 has a ring shoulder 36 which is complemented by the ring shoulder 38 of the piston 14. Thus it can be seen that the piston 14 may move to the right within cavity 56 and be inhibited only by the engagement of shoulder 36 with shoulder 38.

Of course, since the brake piston subassembly 10 operates in an environment of hydraulic fluid, it should be understood that a ring seal 40 is provided on the piston 14 to seal the engagement between that piston and piston 16 and a ring seal 42 is provided about piston 16 and a seal 44 on the sleeve 12 to provide a sealed relationship between the piston 16 and the sleeve 12. Of course, these seals must be selected with due consideration given to ambient temperatures, operating pressures, and other criteria as is well known to those skilled in the art. As can be further seen from the illustration of FIG. 1, the leftward movement of piston 14 within the piston 16 is restricted by the engagement of the shoulder 48 of the piston 14 with the shoulder 50 of the piston 16.

With an understanding of the general apparatus of the piston assembly 10 of the instant invention, consideration shall now be made to the fundamental operation thereof. Of course, it is well known to those skilled in the art that the brake piston subassembly 10 will be in operative engagement with a brake stack pressure plate 46. As the piston subassembly 10 forces the pressure plate 46 to the right the pressure plate 46 will cause the several disks of the brake stack to come into frictional engagement with each other thus causing a braking action of the vehicle wheels. When the brake pressure is off, the return mechanism, which shall be discussed in detail hereinafter, causes the pressure plate 46 to return from engagement with the brake stack so as to release the frictional engagements. As will further be discussed hereinafter, the amount of return caused by the return mechanism will be dependent upon the degree of wear experienced in the brake stack so that in a normal operation when the brakes are not applied the shoulders 38 and 48 of the piston 14 will lie somewhere between the shoulders 36 and 50 of the piston 16, that distance being dependent upon the amount of brake stack wear having been experienced and the consequential degree of pressure plate return caused by the return mechanism. With the piston subassembly 10 in its quiescent state the contact pin 30 of the control probe 24 will be in engagement with the bottom of the brake cavity which is not shown. The ball 28 is consequently out of engagement with the seat 52 thus allowing the free flow of hydraulic fluid through the passage 54 and into the chamber 56. As brake pressure is applied hydraulic forces work against piston 14 within the cavity 56 and similarly against the piston 16. The springs 18, 20, and 22 seek to cause the separation of pistons 14 and 16 and further seek to cause the control probe 24 to engage with the seat 52. As the brake pressure builds up the piston 14 moves to the right taking up the clearance distance between the pressure plate 46 and the brake stack, this distance often referred to as the built-in clearance. When the disks of the brake stack start to come into frictional engagement with each other the motion of the piston 14 substantially ceases and the hydraulic pressure within the piston subassembly 10 begins to increase. Since the piston 16 is substantially larger than piston 14 it would be understood that, for any given pressure, the hydraulic force upon piston 16 is substantially greater than that upon piston 14. Eventually, this pressure or force differential becomes sufficient to overcome the separating force caused by the springs 18, 20, and 22.

When the force differential between the forces acting upon piston 14 and piston 16 becomes sufficient to overcome the forces exerted by the springs 18, 20, and 22 the piston 16 begins to move to the right due to the differential force. As the piston 16 moves to the right the control probe 24, under the force of the spring 22, stays stationary until such time that the seat 52 comes into sealing engagement with the sealing ball 28. At this time the cavity 56 is sealed by means of the ball and seat valve 28, 52 and the sealing ring 40. At this time the piston 14 effectively becomes a solid hydraulic column and the remaining brake pressure force then begins to act solely upon the piston 16. Consequently, the base area of the piston 16 provides the actual brake force area for the braking action and hence the largest piston area in the system comprises the entire working force area.

It should now be appreciated that the small piston 14 merely provides the means for causing the pressure plate 46 to bring the disks of the brake stack into frictional engagement. The actual braking force is applied by means of the larger piston 16. Further, it should be noted that specific arrangements have been made to limit the travel of the various pistons within their respective cylinders. The ring shoulders guarantee that none of the pistons will blow out of their cylinders under any circumstances thus guaranteeing that no total braking failure will be experienced. Further, if the control probe 24 were to fail by sticking in an open position, the most feasible failure, the braking force of the piston subassembly 10 would not be substantially affected. If this situation arose it should be appreciated that the actual braking force area available would comprise that of piston 14, the only force being lost in this condition being the differential force related to the difference in work areas between the piston 14 and the piston 16.

Hence it can be seen that the piston subassembly 10 of the instant invention comprises a substantially fail safe telescopic brake piston assembly which can readily compensate for brake stack wear while maintaining substantially the same sleeve housing size and available working force area as the brake piston subassemblies of the prior art. In other words, the telescoping effect has been achieved without sacrificing subassembly size or effective piston work area.

It should of course be recognized that the specific selection of materials, piston sizes, spring arrangements and tensions, and other parameters may be readily selected by one skilled in the art so as to be consistent with the particular operational chracteristics desired. Indeed, two springs, one to control the control probe 24 and one to control separation of the pistons, could easily achieve the purposes of the invention but it was found that the three springs of the preferred embodiment resulted in satisfactory operation without any one spring being excessively large.

RETURN MECHANISM

Figure 2:
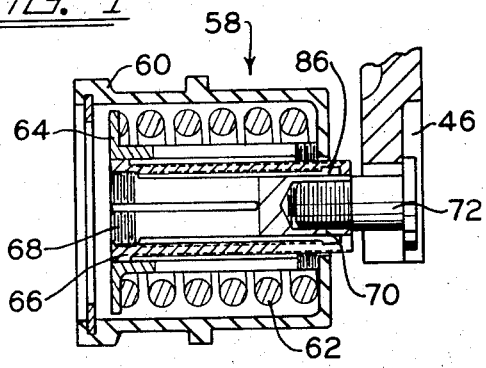
FIG. 2 is a cross sectional view of the telescopic return mechanism according to the teachings of the invention.

Of course, with the advent of the telescopic piston subassembly 10 as described hereinabove it is necessary to add a complementary telescopic return mechanism to the brake assembly. Such a return mechanism is illustrated in FIG. 2 and designated generally by the numeral 58. As can be seen from the figure, the return mechanism comprises a casing 60 which would be fixedly attached to the brake unit housing which is not shown. Within the casing 60 is a spring 62 which is operatively engaged with a spring follower 64. As will be discussed hereinafter, the spring follower 64 is fundamentally a gripping tubular member which receives a sleeve 66 therein. The sleeve 66 is itself a tubular member which receives a gripping tubular member 68 therein. The member 68 is tapped and threaded at a solid end 70 thereof such that a bolt 72 may fixedly engage the member 68 to the brake pressure plate 46.

Figure 4:
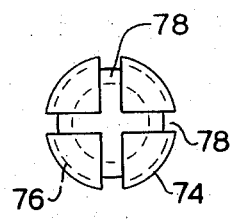
FIG. 4 is a front view of the head of the element of FIG. 3.
Figure 3:
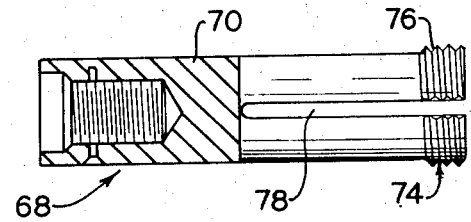
FIG. 3 is a cross sectional view of the smallest tubular member contained within the return mechanism.

A more detailed drawing of the element 68 is shown in FIGS. 3 and 4 of the drawings. Here it can be seen that the element 68 is characterized by an enlarged head 74 being threaded with threads 76 about the circumference thereof. The element 68 is further characterized by the presence of the slots 78 which pass through the head 74 through a substantial portion of the body of the element 68. These slots 78 effectively divide the element 68 into longitudinal quadrants. The slotted portion of the element 68 is then effectively a spring biased gripping element. In other words, it can be seen that if substantial force is provided toward the center of the head 74 all around the circumference thereof the four separate portions of the head 74 would squeeze towards the center thereof thus effectively reducing the size of the head 74. Of course, the unslotted portion 70 of the element 68 remains solid so as to be tapped and threaded to receive the pressure plate engaging bolt 72.

Figures 5, 5A, 6:
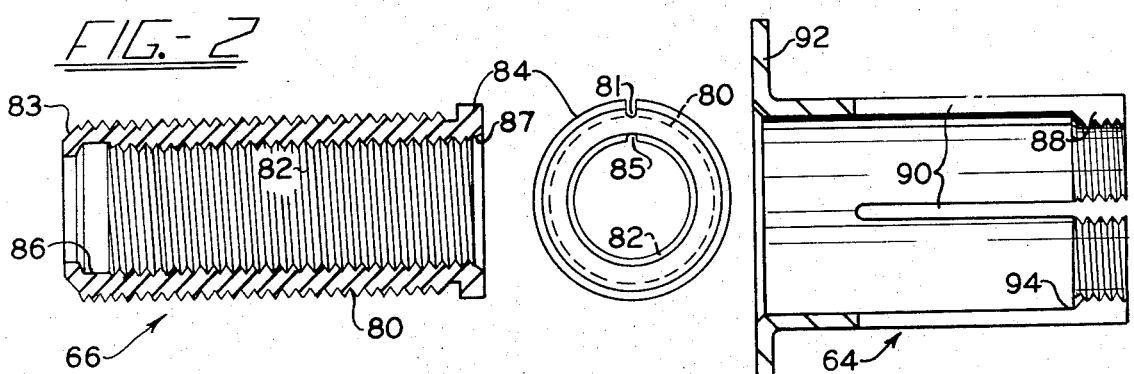
FIG. 5 is a cross sectional view of the rigid sleeve utilized in the return mechanism.
FIG. 5A is a front view of the head of the element of FIG. 5.
FIG. 6 is a cross sectional view of the spring follower of the return mechanism.

The sleeve 66 is more fully shown in FIG. 5. It can be seen that the sleeve 66 comprises substantially a tubular member having threads 80 and 82 respectively about the outside and inside circumferences thereof. The sleeve 66 is further characterized by the presence of an enlarged head 84. The inside diameter of the sleeve 66 is substantially the same as the outside diameter of the body of the element 68. The threads 82 about the inside circumference of the sleeve 66 are complementary with the threads 76 about the circumference of the head 74 of the element 68. The inside of the sleeve 66 is further characterized by the presence of a circumferential groove 86 of substantially the same width as the thickness of the head 74 of the element 68.

FIG. 6 illustrates in detail the spring follower 64. This element is fundamentally tubular in nature and is characterized by the quadrature slots 90. The slots 90 again cause the spring follower 64 to have a spring type gripping characteristic in the slotted portion thereof. The element 64 is further characterized by the presence of a flange head 92 to receivably engage with the spring 62. It is further characterized by the presence of the threads 88 on an enlarged shoulder portion 94 thereof. The threads 88 of the spring follower 64 are complementary with the threads 80 of the sleeve 66. Further, the diameter of the threaded shoulder portion 94 of the elements 64 is substantially the same as that of the body of the sleeve element 66. It is contemplated that after the slots 90 are cut into the element 64 that element will be heat treated such that the element 64 will taper slightly in the slotted region such that the threaded shoulder area 94 will be effectively spring biased toward the centerline of the element 64.

With an understanding of the basic elements of the return mechanism 58, reference should again be made to FIG. 2 for an appreciation of the operation of that mechanism. Here it can be seen that the element 68 is bolted to the pressure plate 46 by means of the bolt 72. The threads 76 on the head 74 of the element 68 are in gripping engagement with the threads 82 about the inside circumference of the sleeve 66. The threads 80 about the outside circumference of the sleeve 66 are in a gripping engagement with the threads 88 on the shoulder 94 of the spring follower 64. The spring follower 64 is of course engaged with the spring 62.

It should of course be understood that as in most return mechanisms, when the brake piston subassembly is activated so as to cause the pressure plate 46 to force the brake disks into frictional engagement the spring 62 compresses as the spring follower moves to the right as shown in FIG. 2. When the brake pressure is released the spring 62 causes the spring follower to return to its quiescent position thus withdrawing the pressure plate 46 to the left. It should be understood that as the brake disks begin to wear a point will be reached where the pressure plate 46 will not be allowed to travel a distance sufficient to cause the necessary frictional engagement of the brake disks because of the compression of the spring 62. At this point the threads on the various elements of the return mechanism 58 begin to serve their purpose. When the brake disk stack has worn to the point where the return mechanism 58, as shown in FIG. 2, will not allow the pressure plate 46 to travel a sufficient distance to cause frictional engagement, the force applied to the pressure plate 46 by the brake piston subassembly 10 will cause the slotted portion of the member 68 to compress and the threads 76 on the head 74 thereof will jump to the next set of threads of the threads 82 within the sleeve 66. Thus the return mechanism has effectively extended its operative length one thread's distance and has allowed the pressure plate 46 to cause the necessary frictional engagement. As the disks wear more and more, the threads 76 shift in the threads 82 by the tension affectuated compression of the slotted portion of the element 68. This process will continue until the head 74 of the element 68 comes to rest in the circumferential slot 86 of the sleeve 66.

With the head 74 of the element 68 terminally positioned in the circumferential groove 86 of the sleeve 66 the threads 80 and 88 begin to slip in a similar manner.

As brake pressure is applied to the pressure plate 46 the grooved portion of the spring follower 64 slightly expands so as to allow the threads 80 of the sleeve 66 to slip a position in the mating threads 88 on the shoulder 94 of the spring follower 64. This telescoping effect continues in relation to brake disk wear until the head 84 of the sleeve 66 comes into stopping engagement with the shoulder 94 of the spring follower 64. At this point the return mechanism 58 has extended its maximum length and the maximum usefulness of the carbon brake disk with which it has been associated has been realized.

With a basic understanding of the apparatus and operation of the telescopic brake piston and return mechanism, several specific attributes and characteristics of the return mechanism will now be considered. Referring now to FIG. 5a, a top view of the sleeve 66 from the end having the head 84 may be seen. Here it can be noted that the inside threads 82 are interrupted by the presence of a notch 85 extending the full length of the body of the sleeve 66. Similarly, the threads 80 are interrupted by the presence of a notch 81 extending the full length of the body. These notches are of such nature and size as to receive pieces of lock wire therein so that when the return mechanism subassembly is constructed and as it progressively extends due to brake wear, the interlocking mating threads of the various components will not unthread from their tightly gripped engagement. It should be understood that if lock wire were not made available between the complimentary threads of the various elements of the return mechanism it would be likely that normal vibrations of the aircraft would encourage the progressive "backing-out" of the threaded elements thus affecting the built in clearance provided for between the pressure plate and the brake disk stack. In general then it can be seen that the provisions of the notches 81 and 85 for the full length of the threaded portions of the sleeve 66 provide an anti-rotation feature for the return mechanism.

It should further be noted by reference to FIG. 5 that the outside circumference of the sleeve 66 has a taper 83 at one end thereof and the inside circumference has a taper 87 at the other end thereof. This tapered characteristic provides for easy assembly of the return mechanism. Particularly, with little force required, the threads 76 of the element 68 may be engaged at the taper 87 with the threads 82 of the sleeve 66. It should be recalled that the slotted portion of the element 68 is of a spring-biased nature and consequently, the taper 87 of the sleeve 66 serves a very useful function in allowing the interthreading of the threads 76 with the threads 82. Similarly, the taper 83 allows the interthreading of threads 80 with the threads 88 in the spring-biased section of the spring follower 64.

It should now be appreciated that the telescopic return mechanism extends as the brake disk stack decreases in size due to wear such that the distance which the pressure plate 46 must travel for each braking action is the same regardless of the wear on the individual carbon brake disks. In other words, the built in clearance or free travel distance to be experienced by the brake piston subassembly will always be the same and will be independent of brake disk wear.

Figure 7:
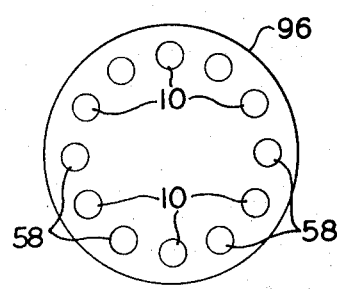
FIG. 7 is a pictorial showing of a brake system housing populated with a plurality of telescopic piston subassemblies and return mechanisms.
Figure 8:
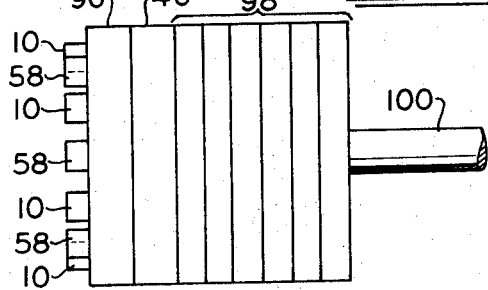
FIG. 8 is a pictorial showing of the interrelationships between the telescopic piston subassemblies, return mechanisms, brake system housings, brake disk pressure plate, brake disk stack, and wheel axle of an aircraft.

It should be noted that the instant invention contemplates the utilization of a plurality of telescopic brake piston subassemblies 10 and return mechanisms 58 to be associated with each brake on the aircraft. Particularly, as is shown in FIG. 7, a brake housing 96 is shown to be alternately populated with piston subassemblies 10 and return mechanisms 58. This type of arrangement is of course well known and understood in the art and is further depicted in FIG. 8. The latter figure illustrates the relationship between the piston subassemblies 10, return mechanisms 58, brake housing 96, brake pressure plate 46, and the plurality of carbon brake disks 98 comprising the brake disk stack. It should be understood that if alternating brake disks 98 are fixedly attached to the axle 100 and the other brake disks 98 are fixedly related to the wheel hub then when the piston subassembly 10 cause the pressure plate 46 to force the various brake disks 98 into frictional engagement a braking action will be realized and when the return mechanisms 58 cause the withdrawal of the pressure plate 46 and a separation of the disks 98 then a release of braking action will be realized.

Thus it can be seen that the objects of the invention have been achieved by the presentation of the apparatus presented and described in detail hereinabove. While in accordance with the Patent Statutes only the best known preferred embodiment of the invention has been illustrated and described in detail, it is to be understood that the invention is not limited thereto or thereby. Consequently, for a true appreciation of the invention in its contemplated breadth reference should be had to the accompanying claims.

What is claimed is:

1. A braking system associated with a brake system housing and the pressure plate of a brake disk stack, comprising:

a telescopic brake piston subassembly fixedly attached to the brake system housing and in operative engagement with the pressure plate, the piston subassembly comprising at least two pistons, a smaller piston slidably received within a larger piston, the larger piston being slidably received in a sleeve housing, and wherein a cavity exists between the two pistons, the cavity containing at least one spring in operative separating engagement between the two pistons and at least one spring in operative separating engagement between the smaller piston and a control probe, the control probe providing a valve to control the flow of braking fluid into and out of the cavity, the piston subassembly causing frictional engagement of the disks of the brake stack upon actuation thereof; and a telescopic return mechanism fixedly attached to the brake system housing and in operative engagement with the pressure plate such that upon release of the actuation of the piston subassembly the return mechanism acts to relieve the frictional engagement of the disks of the brake disk stack, the piston subassembly and return mechanism being operationally unaffected by brake disk stack wear.

2. The braking system as recited in claim 1, wherein the pistons and sleeve housing are characterized by the presence of complementary ring shoulders providing a means for restricting the motion of the smaller piston within the larger piston and of the larger piston within the sleeve housing.

3. The braking system as recited in claim 1, wherein the telescopic return mechanism comprises a plurality of progressively smaller inter-engaging tubular members, each such tubular member contained within the immediately larger tubular member, the largest such tubular member being received in a return mechanism casing, each of the tubular members having a plurality of threads thereon which are complementary to and in engagement with the plurality of the threads on each of the immediately adjacent tubular members.

4. The braking system as recited in claim 1 wherein the spring in operative engagement between the two pistons causes a biasing force against the larger piston so as to prevent any movement thereof within the sleeve housing until the hydraulic brake pressure with the braking system acting on the base of the larger piston reaches a predetermined level.

5. The braking system as recited in claim 1 wherein the spring in operative engagement between the smaller piston and the control probe presents a biasing force upon the control probe causing the control probe to engage with a valve seat when the larger piston has moved a predetermined distance within the sleeve housing.

6. The braking system as recited in claim 3 wherein the smallest interengaging tubular member is adapted to fixedly engage with the pressure plate and the largest interengaging tubular member is a spring follower.

7. The braking system as recited in claim 6 wherein there are three interengaging tubular members, the largest and smallest having spring gripping characteristics and the third such member comprising a substantially rigid tubular sleeve.

8. A telescopic brake piston assembly, comprising at least two interfitting pistons, a smaller piston being received in a larger piston, the larger piston being received in a sleeve housing, and wherein a cavity is created between the two pistons, the cavity containing at least one spring in operative engagement between the two pistons and at least one spring in operative engagement between the smaller piston and a control probe, the control probe serving as a valve means for regulating the flow of braking fluid into and out of the cavity.

9. The telescopic brake piston assembly as recited in claim 8 wherein the smaller piston is adapted to be in operative engagement with the pressure plate of the brake disk stack and the larger piston is adapted to provide the braking force working area of the brake piston assembly.

10. The telescopic brake piston assembly as recited in claim 9 wherein the pistons and sleeve housing are provided with ring shoulders for restricting the movement of the smaller piston within the larger piston and of the larger piston within the sleeve housing.

11. The telescopic brake piston assembly as recited in claim 8 wherein the spring in operative engagement between the two pistons presents a force against the larger piston restraining movement thereof within the sleeve housing until the brake pressure within the brake piston assembly reaches a predetermined level.

12. The telescopic brake piston assembly as recited in claim 11 wherein the spring in operative engagement between the smaller piston and the control probe forces the probe to come into sealing engagement with a valve seat when the larger piston has moved a predetermined distance within the sleeve housing, such sealing causing the cavity and smaller piston to comprise a hydraulic column.

* * * * *